United States Patent [19]
Stroud et al.

[11] Patent Number: 5,022,762
[45] Date of Patent: Jun. 11, 1991

[54] APPARATUS FOR OPTICALLY INSPECTING PRINTER DIE MOTIFS

[76] Inventors: Roy C. Stroud, 4120 Round Tree Road, Richmond, Va. 23229; Walter A. Baker, 4031 Dorset Road, Richmond, Va. 23234

[21] Appl. No.: 373,887

[22] Filed: Jun. 29, 1989

[51] Int. Cl.⁵ .............................................. G01B 11/00
[52] U.S. Cl. ..................................... 356/372; 356/138; 356/383
[58] Field of Search ............... 356/138, 150, 372, 378, 356/383, 384; 350/529, 530, 531, 532

[56] References Cited

U.S. PATENT DOCUMENTS

| | | | |
|---|---|---|---|
| 1,761,260 | 6/1930 | Gallasch | 356/150 |
| 2,607,270 | 8/1952 | Briggs | 356/381 |
| 3,334,541 | 8/1967 | Delp | 350/531 |
| 3,804,523 | 4/1974 | McCormack | 356/382 |

FOREIGN PATENT DOCUMENTS 2064122  6/1981  United Kingdom ............... 356/383

OTHER PUBLICATIONS

Bausch & Lomb Optical Co., "Toolmakers' Microscope", *Optical Instruments for the Metal Working Industries* (12-1933), pp. 9-11.
MSC Industrial Supply Co., Catalog, 1989, pp. 907, 819, 728.

*Primary Examiner*—Richard A. Rosenberger
*Attorney, Agent, or Firm*—Charles B. Smith; John E. Schneider

[57] ABSTRACT

An apparatus for optically inspecting printer die motifs, with the inspection including measuring the length, width, and depth of motifs, and measuring the circumferential separation of two motifs when more than one motif is disposed on the same printer die, the apparatus includes microscope optics supported by a stand, a table for supporting a precision divider head upon which the printer die carrying the motif is mounted, with the table being movable in an "X" and "Y" direction in a plane perpendicular to the axis of the optical path issuing from the optics, the precision divider head for rotating the printer die motif through the optical path of the optics, a first digital micrometer to measure length of a motif, a second digital micrometer to measure the width of a motif, a dial indicator to measure the depth of a motif, and the rotational indicator to measure the circumferential separation of two motifs on the same printer die.

14 Claims, 2 Drawing Sheets

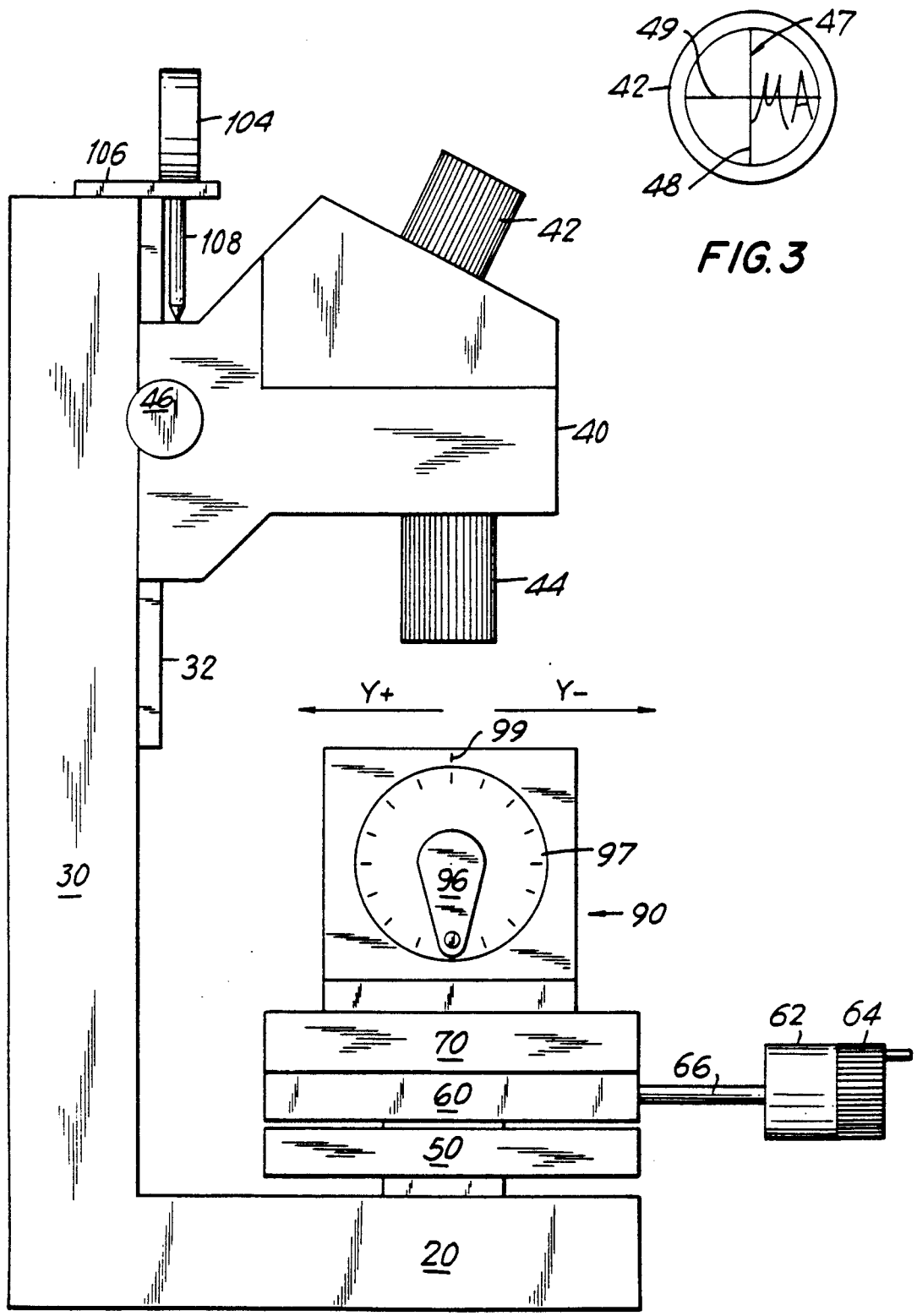

APPARATUS FOR OPTICALLY INSPECTING PRINTER DIE MOTIFS

FIELD OF THE INVENTION

The present invention relates to apparatuses for optically inspecting motifs on printer dies that are used in the manufacture of smoking articles. More specifically, the present invention relates to apparatuses for optically inspecting the dimensions, orientation, and circumferential separation of motifs on printer dies that are used in the manufacture of smoking articles.

BACKGROUND OF THE INVENTION

Smoking article manufacturers have sought to maximize the use of printed markings on smoking articles for product advertising, and internal product control and tracking. Normally, these printed markings are placed on the materials that are used in making smoking articles before such smoking articles are assembled. The printed markings are placed on those materials by printer dies which have raised motifs at their outside diameters that carry the information that is desired to be printed.

The printer die motifs are usually for the brand name and the manufacturer's code. The brand name is intended to be printed at place on the smoking article where it would be visible on the finished smoking article, while the manufacturer's code, which is used for internal tracking and control, is printed where it would be covered, for example, by filter tipping paper in the finished product. When the printer die has two dies, they are usually disposed 180° apart on the outside diameter.

In the past, printing the brand name and manufacturer's code on the smoking article with printer dies during the manufacturing process generally constituted the following:

The printer die motifs are inked and otherwise prepared for printing of the brand name and manufacturer's code on the outer wrap of the smoking article. The printer die is rotated on a mandrel at a speed that equals the speed a web of outer wrap that is moving past the printer die. When the die is properly positioned, the die is moved into contact with the moving web. When the motifs contact the web, the motifs' characters are printed on the web. The outer wrap then proceeds to an another apparatus or station that forms the smoking article rods and attaches filters to them.

Smoking article manufacturers inspect the printer die motifs periodically because they wear down from use and require replacement. Two of the most frequent times that they are inspected are before the first use of the printer die and when problems arise on the manufacturing floor. Among the problems that may arise are that the markings are not clear when printed on the outer wrap, or the printed markings are crooked or improperly oriented. Each of these problems results in a finished product that does not meet normal consumer acceptance standards.

Printer die inspection apparatuses of the past were large, cumbersome, relatively immobile, and expensive. They also required highly skilled technicians to operate them. Therefore, whenever there was a need to inspect printer dies, it involved machine shut-down, printer die removal, and inspection at a location remote from the manufacturing floor. This was a time consuming, difficult, and not a particularly cost effective method to inspect such dies.

The present invention overcomes these problems and provides a relatively simple, easy, and comparatively inexpensive apparatus to inspect printer dies motifs as will be shown subsequently.

SUMMARY OF THE INVENTION

The present invention is a light weight, portable apparatus for inspecting the dimensions and orientation of printer die motifs such as a brand name motif ("brand motif"), manufacturer's code motif ("module motif"), or other type of motif on printer dies used in the manufacture of smoking articles.

The apparatus of present invention includes industrial-type microscope optics with a support structure and a movable table upon which a precision dividing head is disposed. The precision dividing head includes a mandrel upon which the printer die to be inspected is mounted. The apparatus also has indicators that are used for making several different motif measurements.

The movable table is movable in a predetermined "X" and a predetermined "Y" direction in accordance with a coordinate system in a plane parallel to the top surface of the table. This plane is perpendicular to the axis of the optical path issuing from the optics.

The apparatus of the present invention measures the distance that the table moves in either the "X" or "Y" direction from a zero point. A digital micrometer measures the movement in the "X" direction for determining the length of a motif and another digital micrometer measures movement of the table in the "Y" direction for determining the width of the motif. In making these measurements, the orientation of the motif also is determined.

The optics has a dial indicator associated with it that is used in measuring the depth of a motif. The dividing head also acts as a rotational indicator that is used in measuring the circumferential separation of two motifs on the same printer die.

The optics has a reference means that is visible through it. The reference means is used in measuring the length and width of a motif, and in measuring the circumferential separation of two motifs on the same printer die.

The apparatus of the invention measures the dimensions of the printer die motifs and the circumferential separation of two motifs, and determines the orientation of motifs in the following manner:

The length and width dimensions of a motif are measured in a predetermined "X" and a predetermined "Y" direction, respectively. In making the length measurement, one end of the printer die motif is located in the field of view of the optics and the movable table is adjusted so that that end of the motif is adjacent the reference means. This determines the length zero position. The movable table is then adjusted so that the other end of the motif is adjacent the reference means. The length the motif is determined by the difference in the readings at the two positions on a digital micrometer. Viewing the motif when it is adjacent the reference means may indicate that the motif is not properly oriented.

The width measurement method is substantially the same as the length measurement method except that measurement is in "Y" direction. First, the reference means is positioned below the motif to make the zero point reading and then above the motif for the final width reading. The difference in the two readings on a digital micrometer is the width of the motif. When the references means is below and above the motif, it may indicate that the motif is not properly oriented.

The depth measurement is made by bringing the printer die motif into the field of view of the optics and then focusing the optics on the top surface of the motif's characters. This is determined to be the zero position reading for the dial indicator that is used for the depth measurement. The optics is now adjusted to focus on the base the motif's characters. The difference in the dial indicator readings is the depth measurement of the motif.

The circumferential separation of two motifs on a single printer die can also be inspected. This is accomplished by measuring their separation along the outside diameter of the printer die. In measuring the circumferential separation, the reference means is positioned below first motif as seen through the optics. This will be the zero position reading. The printer die is moved 180° from the zero point and locked. If the reference means is below the second motif, the difference in the number of degrees of circumferential separation of the two motifs is 180°. If after movement of 180° from the zero point the reference means is not below the second motif, the second motif is adjusted in the "Y" direction until it is. This linear correction is converted to degrees and added or subtracted from 180° to obtain the number of circumferential separation of the two motifs.

An object of the invention is to provide an improved apparatus to inspect printer die motifs that is portable, simple to operate, and inexpensive.

Another object of the invention is to provide an improved apparatus to inspect printer die motifs and determine the length, width, depth, and orientation of such motifs, and the circumferential separation of the two motifs.

These and other objects will be discussed in greater detail in the remainder of the specification and in light of the drawings.

BRIEF DESCRIPTION OF THE DRAWINGS

FIG. 2 is a side perspective view of the apparatus of the present invention for optically inspecting printer die motifs.

FIG. 3 shows the reference means and the adjacently disposed end of a motif as seen through the optics eyepiece of the apparatus of the present invention when measuring the length of a motif.

DETAIL DESCRIPTION OF THE INVENTION

Figure 1:
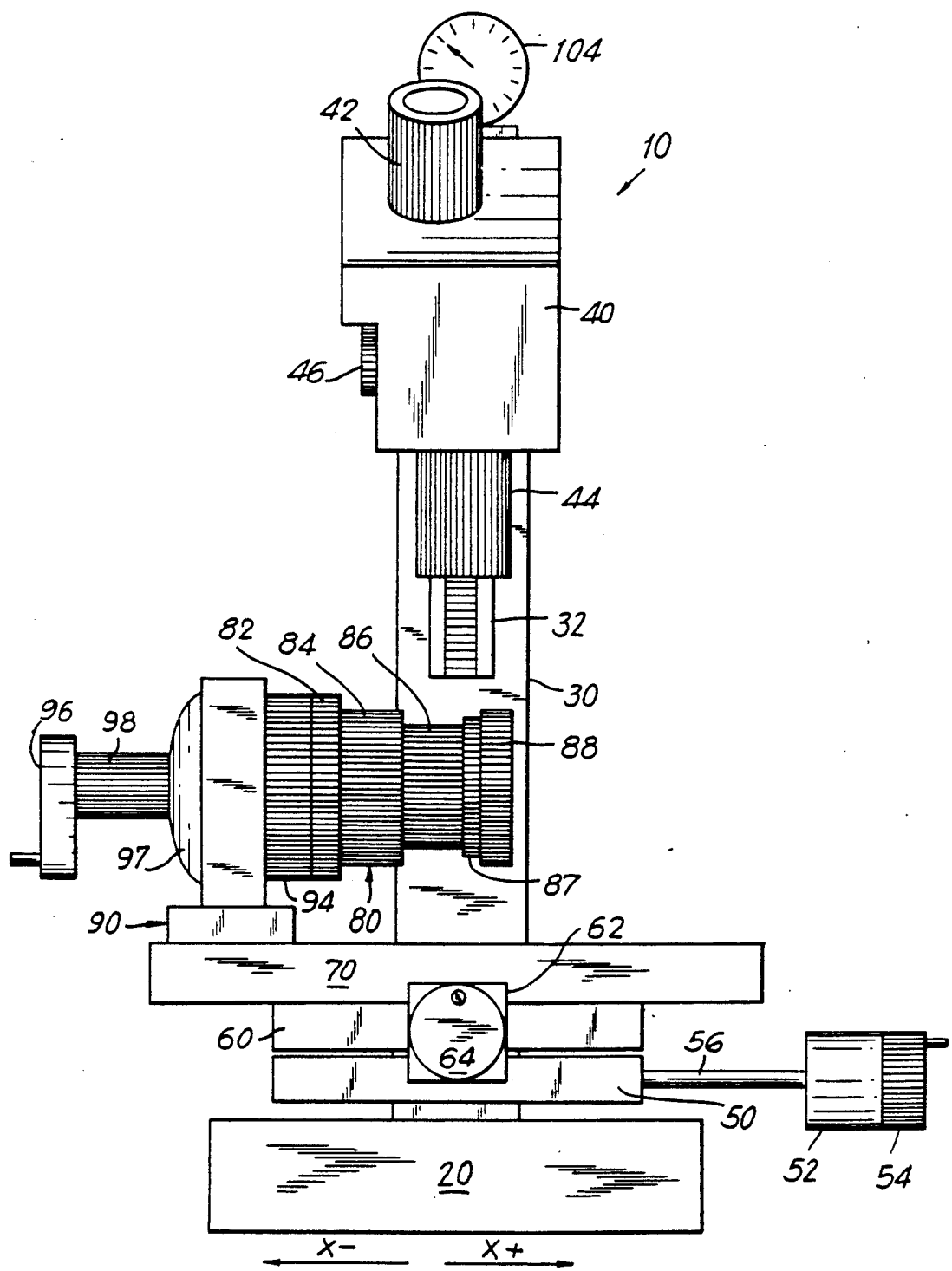
FIG. 1 is a front perspective view of the apparatus of the present invention for optically inspecting printer die motifs.

The present invention is an apparatus for optically inspecting printer die motifs. The inspection includes measuring the length, width, and depth of motifs, measuring the circumferential separation of two motifs when more than one motif is disposed on the same printer die, and determining the orientation of the motifs.

Referring to FIGS. 1-3, the apparatus of the present invention will be described. The elements of the apparatus will be described first and then its method of operation will be described.

The apparatus has base 20 to which vertical member 30 is attached. Elongated square-toothed member 32 is vertically disposed on a surface of the vertical member. Microscope optics 40 is translatably fixed to the elongated member. The optics may be caused to translate along the elongated member by turning knob 46 which connects to a gear that meshes with the square teeth of the elongated member as the knob is turned.

The microscope optics include eyepiece 42 and lens 44. The remainder of the optics within the body is conventional. In the preferred embodiment, a single eyepiece and a lens with a magnification of 2× are used. Preferably, the base, vertical member with the elongated member, and the optics are parts from a toolmaker's microscope commercially available from MTI Corporation, Paramus, N.J., under part no. 176-911.

Eyepiece 42 has cross hairs 47 associated with it. Cross hair 48 is disposed vertically and cross hair 49 is disposed horizontally as viewed through the eyepiece. The cross hairs are shown in FIG. 3. Even though the cross hairs shown in FIG. 3 are oriented in the "X" and "Y" directions for use with the "X"/"Y" coordinate system that is in a plane parallel to the top surface of table 70, it is to be understand that it is within the scope of the invention that the eyepiece can be rotated so that the cross hairs may be oriented in other than as shown in FIG. 3.

In the preferred embodiment of the invention a single eyepiece is used; however, it is to be understood that two eyepieces for stereoscopic viewing of the motifs are within the scope of the invention. It is also understood that lenses of other magnifications may be used and still remain within the scope of the present invention.

Bracket 106 is disposed at the top of vertical member 30. This bracket supports dial indicator 104. Needle 108 extends from the bottom of the dial indicator and through the bracket. The needle contacts a portion of the optics body. Hence, movement of the optics up and down moves the needle up and down with it. The distance that the needle moves up or down from a zero position is shown on the dial indicator display. As will be explained, the dial indicator is used in measuring the depth of a motif. The length of the needle is adjustable as is known by a person of ordinary skill in the art. Preferably, the dial indicator is a vertical style, multiple revolution type dial indicator.

It is to be understood that other than a dial indicator may be used to measure the movement of the optics and still be within the scope of the present invention. For example, a linear scale disposed along the vertical member may be used.

Table 70 is movable in the "X" and "Y" directions of a "X"/"Y" coordinate system in a plane that is parallel to the top surface of the table. The "X"/"Y" coordinate system for the purposes of the present invention is conventional and the "X" and "Y" directions are shown in FIGS. 1 and 2, respectively.

Movement of table 70 in the "X" and "Y" directions is effected by subplates 50 and 60 disposed between base 20 and table 70. Both subplates are movable with respect to base 20 and each is movable in a direction 90° from that of the other. Subplate 50 moves the table in the "X" direction and subplate 60 moves the table in the "Y" direction.

Movement of table 70 in the "X" direction is controlled by digital micrometer 52 that is connected to subplate 50 by threaded shaft 56. Rotation of handle section 54 in a first or second direction causes the the subplate 50 and, therefore, table 70 moves in the "X+" or "X−" direction, respectively.

The digital micrometer has a digital display that indicates the distance that the table has moved from a predetermined zero position. The predetermined zero position can be selected by the operator. Hence, once the zero position is determined, the distance that table has moved from it is continuously displayed on the digital micrometer. Preferably, the digital micrometer is from MTI Corporation, Paramus, N.J., and is commercially available under part no. 164–136.

In a similar manner, movement of table 70 in the "Y" direction is controlled by digital micrometer 62 that is connected to subplate 60 by threaded shaft 66. Rotation of handle section 64 in a first or second direction causes subplate 60 and, therefore, table 70 to move in the "Y+" or "Y−" direction, respectively.

Digital micrometer 62, like digital micrometer 52, has a digital display that indicates the distance that subplate 60 has moved the table from a predetermined zero position. This zero position, however, may be changed by the operator to any position he or she may want to designate as the zero position. Preferably, this digital micrometer is also from MTI Corporation, Paramus, N.J., and is commercially available under part no. 164-136.

Precision dividing head 90 is fixed to the top surface of table 70. The dividing head includes base frame 92 which has an opening that rotatable receives cylindrical body 94. Axially aligned shaft 98 connects to an end of the cylindrical body and hand crank 96 connects to the distal end of the shaft. Hence, turning of the hand crank will rotate the cylindrical body.

The end of the cylindrical body to which shaft 98 is fixed has dial 97 fixed to it. The dial has degree markings from 0° to 359°. The base frame has single mark 99 adjacent the dial to indicate the current position of the dial in degrees. Therefore, from a known starting degree position, the approximate number of degrees that the cylindrical member has been rotated can be continuously observed where the tolerance for determining circumferential separation is less than a degree. Accordingly, the precision dividing head constitutes a rotational indicator and may be used to provide a rough measurement of the circumferential separation of two motifs on the same printer die. Preferably, the precision dividing head is a Punch Mate #1 that is commercially available from ATCO Precision Tools, Inc., Troy, Mich., under part no. 952240.

Stepped mandrel 80 is connected to the cylindrical body of the precision dividing head. First step 82 has an outside diameter equal to that of the end of the cylindrical body to which it attaches. Second step 84 has a diameter less than that of the first step. The second step is a spacer section. Third step 86 has a diameter less than that of the second step. The diameter of the third step is of a size to accommodate disposition of a printer die to be inspected. The ledge that is formed between the second and third steps acts as a stop for the printer die disposed on the third step. Rubber washer 87 fits over the end of the third step and is intended to contact the end of a printer die that is disposed on the third step. End cap 88 having an outside diameter greater than the third step is disposed on the end of the third step. Preferably, the end cap engages threads at the end of the third step in a screw-nut relationship. However, it is understood that other methods of securing the printer die on the third step are within the scope of the present invention. For example, a clamp or a pin may be used.

The following is a representative method of inspecting motifs and their orientation on a printer die. For the purposes of illustration, the printer die has a brand motif "M - - - O", with "M" being the first character, "O" being the last, and the intermediate characters being represented by the dashed lines, and a module motif, "1B1—1B1." Also for purposes of illustration, first, a method of making length measurements and a first orientation check will described, second, a method of making width measurements and a second orientation check will be described, third, a method of measuring the depth of motifs will be described, and fourth, a method of measuring the circumferential separation of two motifs on the same printer die will be described.

In this illustrative example, the motif characters are disposed horizontally across the printer die when it is on the mandrel. However, the motif characters may be disposed vertically, diagonally, or in any desired pattern and still be within the scope of the invention. The methods for making the above-indicated measurements may be used to measure motifs with characters disposed in any pattern, however, in some cases individual characters rather the whole motif will be measured because the particular pattern of motif characters is not conducive to measuring all of the motif characters together.

The printer die with two motifs is placed on step 86 of mandrel 80. Rubber washer 87 is placed in the third step and then end cap 88 is screwed onto the third step, securing the printer die in place.

The first measurement to be made is the length measurement. Once the printer die is secured on the mandrel, the motif is brought into the view of the optics. Crank 96 of precision dividing head 90 is rotated until the brand motif is facing upward toward lens 44 and the handle sections of the digital micrometers are rotated to bring the motif generally in the field of view of the optics. After this is done, the optics are focused, and then the table is moved so that the first character of the motif, "M", is adjacent vertical cross hair 48, as shown in FIG. 3.

Following proper positioning of the first end of the brand motif adjacent the vertical cross hair, digital micrometer 52 is zeroed. Handle section 54 of the digital micrometer is now turned so that the table moves in the "X" direction. The table is moved until the last character of the motif, "O", is positioned adjacent the vertical cross hair. When the "O" is so positioned, the vertical cross hair is immediately to the right of the last character, "O". The reading on the display of the digital micrometer is the length of the motif.

The orientation of the motif may also be checked when the length measurement is being made. Disposition of the motif character adjacent vertical cross hair 43 may reveal improper orientation of the motif or a portion of the motif. This may be particularly evident when a portion of a character that should be vertical and parallel to the "X" axis does not align with the vertical cross hair.

After the length measurement is made, the width measurement is made. Since the optics are already focused, the table is positioned so that horizontal cross hair 49 is immediately below the motif. Usually, the horizontal cross hair is positioned below the center of the motif, however, it is within the scope of the present invention that the horizontal cross hair can be below any portion of the motif.

When the horizontal cross hair is properly placed, digital micrometer 62 is zeroed. After it is zeroed, handle section 64 is turned so that table 70 moves in the "Y" direction until the horizontal cross hair is immediately above the motif. The display of digital micrometer indicates the width of the motif.

The orientation of the motif is checked when the horizontal cross hair is above and/or below the motif. If the motif or any motif character is improperly oriented, it can be readily viewed by the relationship between the horizontal cross hair and the motif characters.

In making the depth measurement cross hairs 47 are not used. Once the motif or portion of the motif is in the field of view of the eyepiece, the optics are focused on the top surface of the motif. After focusing, dial indicator 104 is zeroed. Following zeroing of the dial indicator, the optics are focused on the base of the motif. As the optics are moved to focus first on the top and second on the base of the motif, needle 108 of the dial indicator moves with the optics, thereby causing the display to show the change in the disposition the needle. The display of the dial indicator shows the depth of the motif.

The next measurement to be made is the circumferential separation of the two motifs on the same printer die. In making this measurement cross hair 49 is used. Preferably, the table is positioned so that the horizontal cross hair is below the first motif. This is the zero point for measuring the circumferential distance between the two motifs.

After determining the zero point, crank 96 of precision dividing head 90 is turned 180° and locked. Once locked, the motif is viewed to determine if horizontal cross hair 49 is below the second motif. If it is, the motifs are 180° apart in circumferential separation. If the horizontal cross hair is not below the second motif, an adjustment must be made to determine the final circumferential separation of the motifs.

To determine the adjustment, digital micrometer 62 is zeroed and the locked motif is moved in the "Y+" or "Y−" direction by turning handle section 64 of digital micrometer 62 until horizontal cross hair 49 is below the second motif. When it is, the display of the digital micrometer shows the distance from the zero point the die has moved. The angular adjustment in minutes of a degree is determined by the following expression:

$$A = \frac{(C_{PD})(T_M)(D)}{(6)}$$

where,

A = adjustment in minutes of a degree
$C_{PD}$ = circumference of the printer die
$T_M$ = tolerance in minutes of a degree
D = measured distance in the "Y" direction.

The adjustment is added or subtracted to 180° to give the circumferential separation of the two motifs.

The following is an alternative method of measuring the circumferential separation of the two motifs. The precision dividing head, according to this method, has a dial and associated display that indicate the degrees and minutes of the current position of the dial. The display can be zeroed in any position.

Horizontal cross hair 49 is disposed below the first motif. The display of the precision dividing head is zeroed. Crank 96 of the precision dividing head is turned until the horizontal cross hair is below the second motif. When it is, the degree and minutes are displayed. This is the circumferential separation of the two motifs.

Following making the length, width, and depth measurements, the orientation determinations, and the circumferential separation measurement for the brand motif, "M - - - O", these same measurements and determinations, are made for the module motif, "1B1—1B1".

The descriptions for making the aboveindicated measurements set forth specific methods for making such measurements and a specific order in making them. However, it is within the scope of the invention that such measurements may be made in any order and that the eft or right end of the motif in making the length measurement, or the top or the bottom of the motif in making the width measurement, or the top surface or the base of the motif in making the depth measurement, or the first or the second motif in making the circumferential separation measurement may be the zero point for making the measurement.

The terms and expressions which are used herein are used as terms of description and not of limitation. And, there is no intention, in the use of such terms and expressions, of excluding the equivalents of the features shown and described, or portions thereof, it being recognized that various modifications are possible in the scope of the invention.

What is claimed is:

1. A portable apparatus for inspecting dimensions and an orientation of printer die motifs, comprising:
   optics for viewing a printer die motif, with the optics being supported by a support means;
   means for positioning the printer die in a predetermined manner;
   means for measuring at least three dimensions of a printer die motif;
   means for moving a printer die motif in a first and an opposite second direction in a plane perpendicular to an axis of an optical path issuing from the optics;
   means for moving a printer die motif in a third and an opposite fourth direction in a plane perpendicular to the axis of the optical path issuing from the optics, with the third and opposite fourth directions being disposed 90° from the first and opposite second direction; and
   means for rotating the printer die motif through the optic path issuing from the optics.

2. A portable apparatus for inspecting dimensions and an orientation of printer die motifs, comprising:
   optics for viewing a printer die motif, with the optics being supported by a support means;
   means for positioning the printer die motif in a field of view of the optics;
   means for measuring at least three dimensions of a printer die motif and a circumferential separation between two printer die motifs on a printer die; and
   means for determining the orientation of the printer die motifs.

3. The apparatus as recited in claim 1 or 2, wherein the optics comprise microscope optics that includes an eyepiece and lens of a predetermined magnification power.

4. The apparatus as recited in claim 3, wherein the optics further includes a reference means that is disposed across an optical path of the optics as viewed through the eyepiece.

5. The apparatus as recited in claim 4, wherein the reference means includes cross hairs.

6. The apparatus as recited in claim 2 wherein means for positioning the printer die motif in the field of view of the optics further comprises:

means for moving a printer die motif in a first and an opposite second direction in a plane perpendicular to an axis of an optical path issuing from the optics;

means for moving a printer die motif in a third and an opposite fourth direction in the plane perpendicular to the axis of the optical path issuing form the optics, with the third and opposite fourth directions being disposed 90° from the first and opposite second directions; and means for rotating the printer die motif through the optic path issuing form the optics.

7. The apparatus as recited in claim 1 or 2, wherein the apparatus includes means for focusing the optics.

8. The apparatus as recited in claim 1, wherein the means for measuring at least three dimensions include means for measuring a length, a width, and a depth dimension.

9. The apparatus as recited in claim 2, wherein the means for measuring at least three dimensions include means for measuring a length, a width, and a depth dimension.

10. The apparatus as recited in claim 8 or 9, wherein the optics includes a reference means that is disposed across an optical path as viewed through the optics and the means for measuring the length dimension includes means actuatable to position a first end of the motif adjacent the reference means as viewed through the optics to provide a zero position for length measurement and thereafter actuatable to position a second end of the motif adjacent the reference means as viewed through the optics to provide a final length measurement that is displayed by display means.

11. The apparatus as recited in claim 8 or 9, wherein the optics includes a reference means that is disposed across an optical path as viewed through the optics and the means for measuring the width dimension includes means actuatable to position a bottom of the motif adjacent the reference means as viewed through the optics to provide a zero position for width measurement and thereafter actuatable to position a top of the motif adjacent the reference means as viewed through the optics to provide a final width measurement that is displayed by the display means.

12. The apparatus as recited in claim 8 or 9, wherein the means for measuring the depth dimension includes means to indicate a zero position for the depth measurement when the optics are focused on a top surface of the motif and thereafter to indicate a final depth measurement when the optics are focused at a base of the motif, with the final depth measurement being displayed by display means.

13. The apparatus as recited in claim 2, wherein the optics includes a reference means that is disposed across an optical path as viewed through the optics and the means for measuring the circumferential separation between two motifs that includes means actuatable to position a bottom of the first motif adjacent the reference means as viewed through the optics to provide a zero position for circumferential separation measurement and thereafter actuatable to position a bottom of the second motif adjacent the reference means as viewed through the optics to provide a final circumferential separation measurement that is displayed by display means.

14. The apparatus as recited in claim 1 or 2, wherein means for determining the orientation of the printer die motif is a reference means that is dispose across an optical path as viewed through the optics.

* * * * *